US011904347B2

United States Patent
Wu et al.

(10) Patent No.: US 11,904,347 B2
(45) Date of Patent: Feb. 20, 2024

(54) VACUUM IMPREGNATION DEVICE

(71) Applicant: Henkel AG & Co. KGaA, Duesseldorf (DE)

(72) Inventors: Wenzhang Wu, Shanghai (CN); Xingtian Yang, Shanghai (CN); Xiaoqiong Meng, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 17/509,962

(22) Filed: Oct. 25, 2021

(65) Prior Publication Data

US 2022/0040724 A1 Feb. 10, 2022

Related U.S. Application Data

(63) Continuation of application No. PCT/CN2019/084059, filed on Apr. 24, 2019.

(51) Int. Cl.
*B05C 3/02* (2006.01)
*B05C 11/00* (2006.01)
*B29C 70/44* (2006.01)
*B05C 3/09* (2006.01)

(52) U.S. Cl.
CPC ............... *B05C 3/02* (2013.01); *B05C 11/00* (2013.01); *B05C 3/09* (2013.01); *B29C 70/443* (2013.01)

(58) Field of Classification Search
CPC .. B05C 3/02; B05C 11/00; B05C 3/09; B29C 70/443; H01F 41/005; B22F 3/26
USPC .......................................................... 118/50
See application file for complete search history.

(56) References Cited

U.S. PATENT DOCUMENTS

| 4,196,231 A | 4/1980 | Hubers |
| 4,620,991 A * | 11/1986 | Young ....................... B22F 3/26 427/430.1 |
| 6,696,143 B1 | 2/2004 | La Point |

(Continued)

FOREIGN PATENT DOCUMENTS

| CN | 1359315 A | 7/2002 |
| CN | 207353076 | 5/2018 |
| DE | 2826768 | 1/1980 |

(Continued)

OTHER PUBLICATIONS

CN207125578, Huang et al., published Mar. 23, 2018 (Year: 2018).*

(Continued)

*Primary Examiner* — Laura Edwards
(74) *Attorney, Agent, or Firm* — Steven C. Bauman

(57) ABSTRACT

The present disclosure provides a vacuum impregnation device for vacuum a impregnating a workpiece. The vacuum impregnation device may include a vacuum impregnation tank for storing glue, the vacuum impregnation tank including a side wall; a sliding block coupled to the side wall of the vacuum impregnation tank, the sliding block being adapted for supporting the workpiece above the glue; and an electromagnetic controller, the electromagnetic controller being disposed outside the vacuum impregnation tank and being operative to move the sliding block towards the side wall of the vacuum impregnation tank such that the workpiece is released and drops into the glue. This type of device has the advantages of simple structure, low cost and convenient operation.

20 Claims, 4 Drawing Sheets

(56) References Cited

U.S. PATENT DOCUMENTS 10,571,611 B2     2/2020   Koenig, II et al.

FOREIGN PATENT DOCUMENTS

| | | |
|---|---|---|
| DE | 3109585 | 5/1983 |
| JP | 54146268 | 11/1979 |
| JP | 07138612 | 5/1995 |
| JP | 5727164 | 6/2015 |
| TW | 201532685 A | 9/2015 |

OTHER PUBLICATIONS

CN108794032, Liao, published Nov. 13, 2018 (Year: 2018).*
PCT International Search Report issued in connection with International Application No. PCT/CN2019/084059—dated Jan. 16, 2020.

* cited by examiner

VACUUM IMPREGNATION DEVICE

FIELD OF THE INVENTION

The present disclosure relates to the technical field of vacuum impregnation, and more particularly to a vacuum impregnation device.

BACKGROUND OF THE INVENTION

In metal castings such as cast aluminum and cast iron, and in electronic parts co-molded by metal and plastic, there are usually many fine pores. These fine pores may cause leakage problems, which may in turn cause serious quality issues. For the automotive industry and the electronic industry, liquid leakage through those fine pores is not allowed.

Vacuum impregnation technology is an effective measure to solve the leakage problem of the metal castings. The vacuum impregnation technology is to infiltrate the impregnating agent into the fine pores of the casting by vacuum-pressure process, and to achieve the purposes of filling the pores, sealing and preventing leakage, and withstanding high pressure, thereby greatly improving the performance of the metal castings.

Currently, there are mainly two types of vacuum impregnation devices. One type of device first evacuates a vacuum impregnation tank and maintains vacuum, and then transfers glue from a storage tank to the vacuum impregnation tank during the impregnation stage to impregnate the workpiece. During the impregnation stage, atmospheric pressure or higher pressure can be applied. The other type of device includes an inner cylinder for storing the glue and an outer cylinder for holding the workpiece. The inner cylinder can move up and down, and the outer cylinder is stationary. During the vacuum stage, the workpiece is above the glue. During the impregnation stage, the workpiece is immersed into the glue by moving the inner cylinder upward to impregnate the workpiece.

The above two types of devices have complicated structure and high cost of construction and operation.

Therefore, there is a need to improve existing vacuum impregnation devices.

SUMMARY OF THE INVENTION

The object of the present disclosure is to improve the existing vacuum impregnation devices, and to provide a new type of vacuum impregnation device. This type of device has the advantages of simple structure, low cost and convenient operation.

According to one aspect of the present disclosure, a vacuum impregnation device for vacuum impregnating a workpiece is provided. The vacuum impregnation device may comprise a vacuum impregnation tank for storing glue, the vacuum impregnation tank comprising a side wall; a sliding block coupled to the side wall of the vacuum impregnation tank, the sliding block being adapted for supporting the workpiece above the glue; and an electromagnetic controller, the electromagnetic controller being disposed outside the vacuum impregnation tank and being operative to move the sliding block towards the side wall of the vacuum impregnation tank such that the workpiece is released and drops into the glue.

In some embodiments of the present disclosure, the vacuum impregnation device may further comprise a transmission mechanism coupled to the sliding block. The transmission mechanism is disposed inside the vacuum impregnation tank. The electromagnetic controller is operative to move the sliding block towards the side wall of the vacuum impregnation tank by the transmission mechanism.

In some embodiments of the present disclosure, the transmission mechanism comprises a linkage and a magnetic substance. The linkage is connected to the sliding block at one end and is connected to the magnetic substance at the other end. The magnetic substance is disposed at a position corresponding to the electromagnetic controller.

In some embodiments of the present disclosure, the linkage comprises a first connecting rod and a second connecting rod which are connected to each other.

In some embodiments of the present disclosure, the vacuum impregnation device may further comprise a spring. The sliding block is coupled to the side wall of the vacuum impregnation tank by the spring.

In some embodiments of the present disclosure, the sliding block is adapted to be moved towards the side wall of the vacuum impregnation tank when the electromagnetic controller is turned on, and the sliding block is adapted to be restored by the spring when the electromagnetic controller is turned off In some embodiments of the present disclosure, the vacuum impregnation device may further comprise a net basket for holding the workpiece. The net basket comprises a lifting lug adapted to be supported by the sliding block. In some embodiments of the present disclosure, the vacuum impregnation device may further comprise a catching component coupled to the side wall of the vacuum impregnation tank. The catching component is adapted to catch the net basket by the lifting lug.

In some embodiments of the present disclosure, the net basket further comprises a projection on a side. The side wall of the vacuum impregnation tank is provided with a guiding groove extending vertically. The projection is adapted to be guided in the guiding groove.

In some embodiments of the present disclosure, the vacuum impregnation tank comprises a tank cover and a tank body. The tank cover is adapted to open and close the tank body.

In some embodiments of the present disclosure, the vacuum impregnation device may further comprise a vacuum pump coupled to the tank cover or the tank body.

In some embodiments of the present disclosure, compressed air flows into the vacuum impregnation tank through the tank cover or the tank body.

In some embodiments of the present disclosure, the vacuum impregnation device may further comprise a piezometer coupled to the tank cover or the tank body.

According to another aspect of the present disclosure, a vacuum impregnation device is provided which may comprise a vacuum impregnation tank comprising a side wall; a sliding block coupled to the side wall of the vacuum impregnation tank; and an electromagnetic controller, the electromagnetic controller being disposed outside the vacuum impregnation tank and being operative to move the sliding block towards the side wall of the vacuum impregnation tank by the transmission mechanism.

The technical effects of the vacuum impregnation device according to the present disclosure are as follows:
1. The vacuum impregnation device of the present disclosure has simple structure and low cost.
2. It is easier to handle the vacuum impregnation process by only turning on and off the electromagnetic controller than transferring the glue or lifting the inner cylinder.

3. The vacuum impregnation device of the present disclosure improves the airtightness and the robustness of the vacuum impregnation tank because no parts pass through the side wall of the vacuum impregnation tank to handle the vacuum impregnation process.

The above advantages and other advantages and features will become apparent from the following detailed description of the preferred embodiments.

BRIEF DESCRIPTION OF THE DRAWINGS

In order to better understand the present disclosure, the present disclosure will be specifically described by the specific embodiments and the accompanying drawings.

DETAILED DESCRIPTION OF THE INVENTION

As will be understood by one of ordinary skill in the art, the various features of the embodiments shown and described with respect to any one of the figures can be combined with the features shown in one or more other figures to produce other embodiments that are not explicitly shown or described. The combination of features shown provides a representative embodiment for a typical application. However, various combinations and modifications of the features are possible in accordance with the teachings of the present disclosure for a particular application or implementation.

In the present specification, the words "upper", "lower", "left", "right" and the like are used for convenience only, and are not restrictive.

Figure 1:
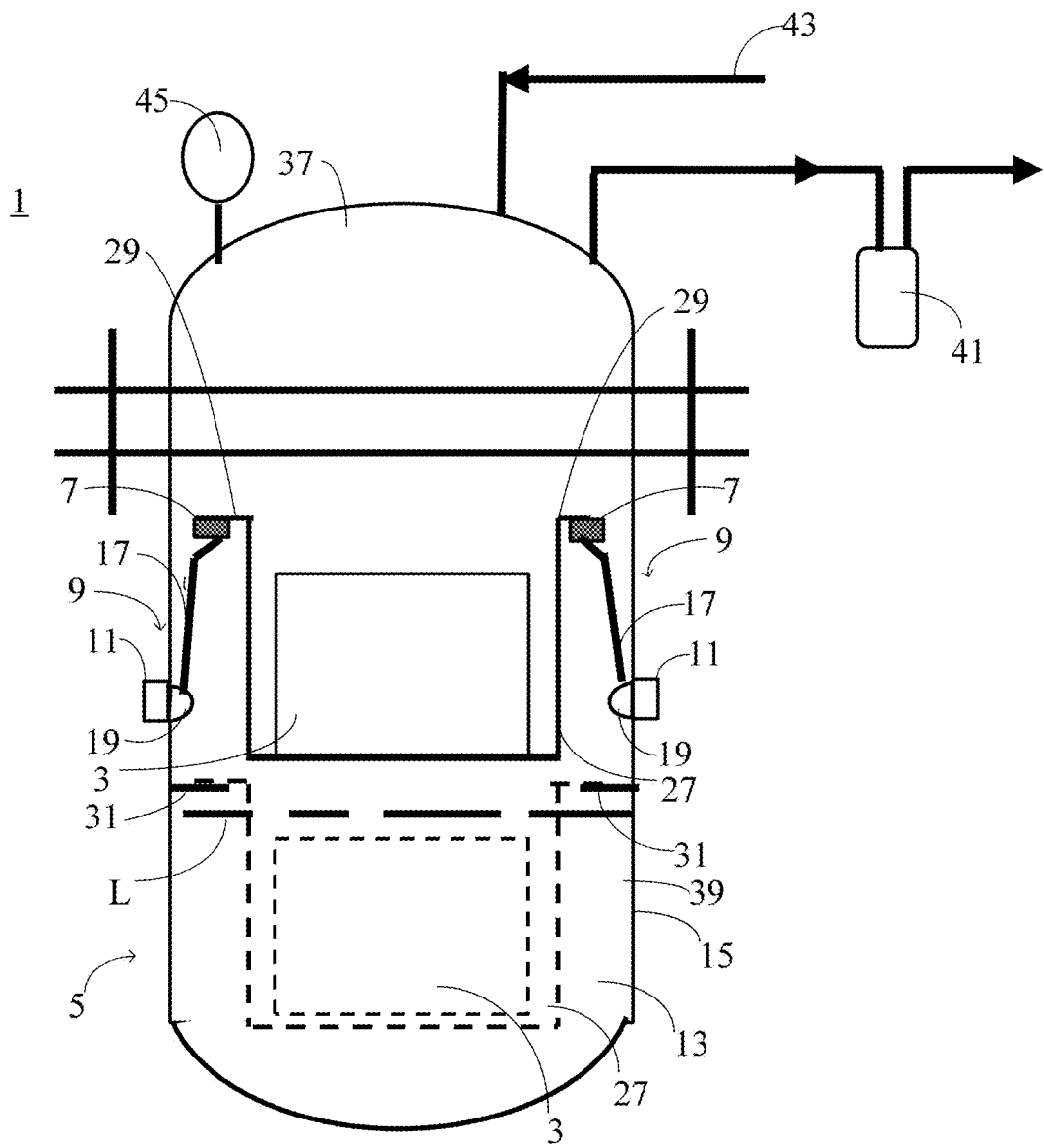
FIG. 1 is a side view of the vacuum impregnation device according to an exemplary embodiment of the present disclosure.
Figure 2:
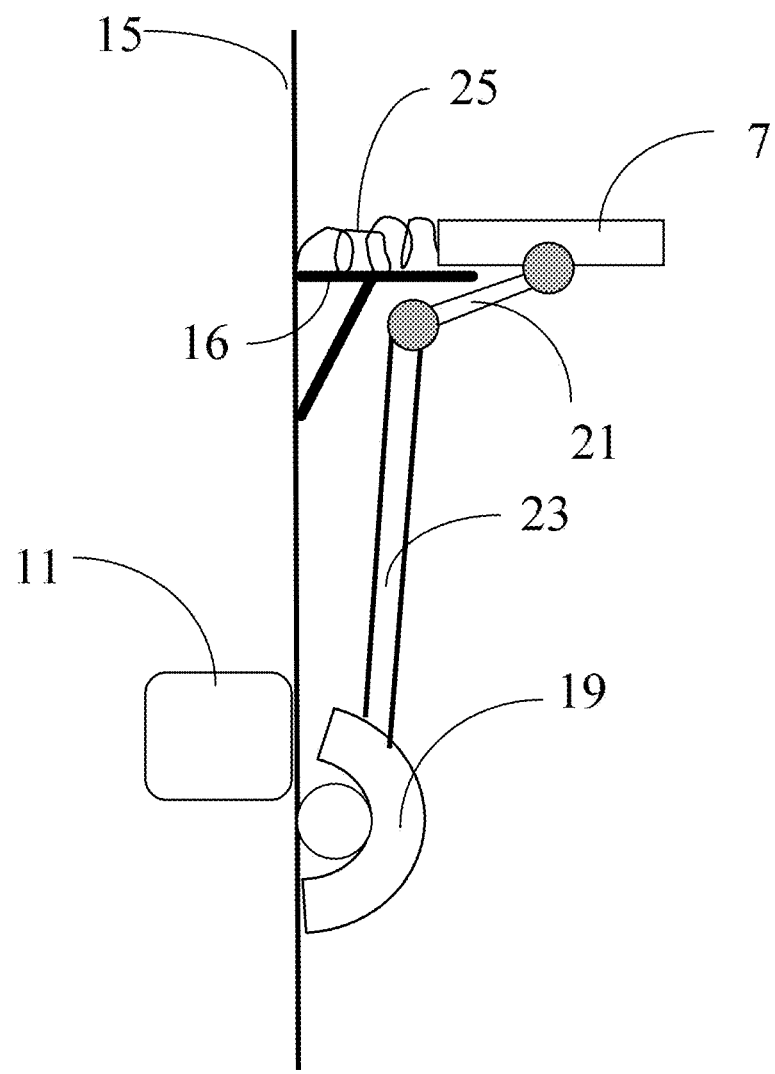
FIG. 2 is a partial enlarged view of the vacuum impregnation device according to an exemplary embodiment of the present disclosure.

FIGS. 1 and 2 are a side view and a partial enlarged view of the vacuum impregnation device 1 according to an exemplary embodiment of the present disclosure. The vacuum impregnation device is used for vacuum impregnating a workpiece 3. The workpiece 3 can be metal castings such as cast aluminum and cast iron and electronic parts co-molded by metal and plastic, which usually have fine pores.

In the illustrated figures, the vacuum impregnation device 1 mainly includes a vacuum impregnation tank 5, two sliding blocks 7, two transmission mechanisms 9 and two electromagnetic controllers 11.

The vacuum impregnation tank stores glue 13. The glue can be any suitable types of glue that can be used to vacuum impregnate the workpiece. For example, the glue can be Henkel's Loctite Resinol 90° C. glue. The vacuum impregnation tank 5 includes a side wall 15.

The two sliding blocks 7 are disposed oppositely in the vacuum impregnation tank 5. The two sliding blocks 7 are coupled to the side wall 15 of the vacuum impregnation tank 5. The sliding blocks 7 support the workpiece 3 above the glue 13, the surface of which is shown by dashed line L in FIG. 1.

Each of the transmission mechanisms 9 is coupled to the corresponding sliding block 7. The electromagnetic controllers 11 are disposed outside the vacuum impregnation tank 5. It should be understood that, "the electromagnetic controllers 11 are disposed outside the vacuum impregnation tank 5" herein include at least the following embodiments: 1) the electromagnetic controller 11 is disposed outside the vacuum impregnation tank without contacting the side wall 15 of the vacuum impregnation tank 5; 2) the electromagnetic controller 11 is physically connected onto the outer surface of the side wall 15 of the vacuum impregnation tank 5; 3) a recess is formed on the outer surface of the side wall 15 of the vacuum impregnation tank 5 and the electromagnetic controller is embedded partly or completely in the recess by welding or threaded connection. Each of the electromagnetic controllers 11 can be operated to move the corresponding sliding block 7 towards the sidewall 15 of the vacuum impregnation tank 5 by the corresponding transmission mechanism 9. As a result, the workpiece 3 is no longer supported by the sliding blocks 7 and drops into the glue 13 under gravity. The workpiece 3 in an immersion state in the glue 13 is shown in dashed lines in FIG. 1.

Figure 4:
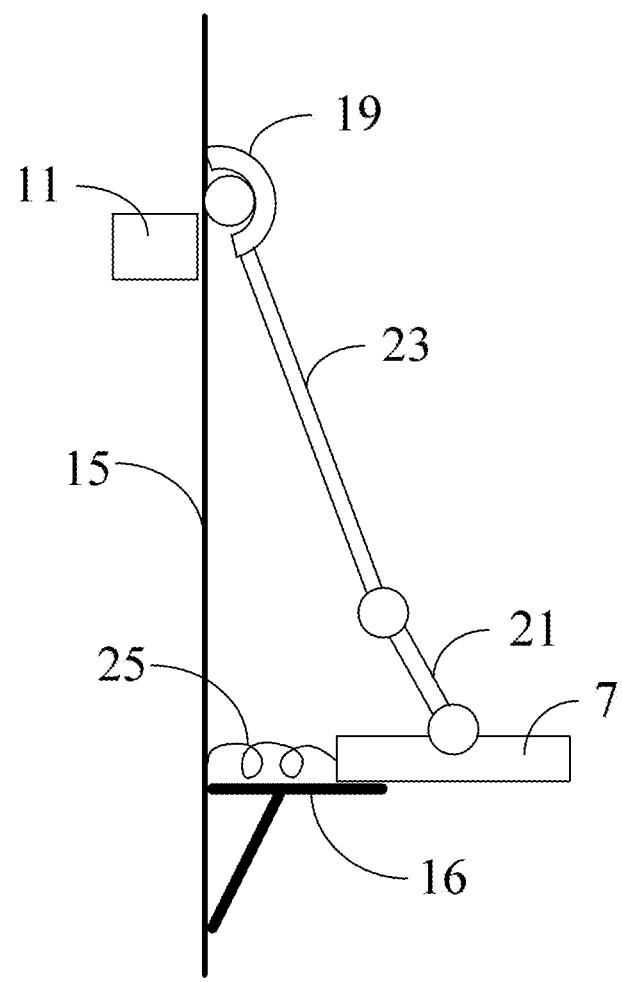
FIG. 4 is a partial enlarged view of the vacuum impregnation device according to another exemplary embodiment of the present disclosure.

As shown in FIG. 4, the sliding block 7 is supported on a bracket 16. The sliding block 7 can slide on the upper surface of the bracket 16. It should be understood that rollers can be installed between the sliding block 7 and the upper surface of the bracket 16 to facilitate the sliding movement of the sliding block 7.

It should be understood that that the number of the sliding blocks 7, the transmission mechanisms 9 and the electromagnetic controllers 11 may be one or more than two. For example, three sliding blocks, three transmission mechanisms and three electromagnetic controllers may be provided evenly around the side wall of the vacuum impregnation tank.

The electromagnetic controller 11 can generate electromagnetic force when it is turned on and this electromagnetic force is exerted on the transmission mechanism 9 which in turn moves the sliding block 7 towards the side wall 15 of the vacuum impregnation tank 5.

Therefore, no components pass through the side wall 15 of the vacuum impregnation tank 5 to move the sliding blocks 7, which keeps an intact side wall 15 of the vacuum impregnation tank 5. This configuration improves the air tightness of the vacuum impregnation tank 5. It is easier to maintain vacuum or higher pressure due to the good air tightness. Besides, the robustness of the vacuum impregnation tank 5 is also improved and thus the vacuum impregnation tank 5 can withstand higher pressure.

As shown in FIGS. 1 and 2, in the illustrated figures, the transmission mechanism 9 includes a linkage 17 and a magnetic substance 19. The magnetic substance 19 herein includes magnets or metal substances that can be attracted by magnets. The linkage 17 is connected to the sliding block 7 at one end and is connected to the magnetic substance 19 at the other end. The magnetic substance 19 is disposed at a position corresponding to the electromagnetic controller 11. Specifically, the linkage 17 includes a first connecting rod 21 and a second connecting rod 23 which are connected to each other. The first connecting rod 21 is also connected to the sliding block 7 and the second connecting rod 23 is also connected to the magnetic substance 19. It should be understood that the linkage 17 may include more than two connecting rods. The connections between the first connecting rod 21 and the sliding block 7, between the first connecting rod 21 and the second connecting rod 23 and between the second connecting rod 23 and the magnetic substance 19 are pivotal connections. It should be understood that the transmission mechanism may be of any configuration provided that it can move the sliding block towards the side wall of the vacuum impregnation device under the electromagnetic force from the electromagnetic controller. With the transmission mechanism, a small movement of the magnetic substance can allow the sliding block to move in a greater distance.

It should be understood that in some embodiments, the vacuum impregnation device may not include the transmission mechanism. In such embodiments, the sliding block itself may a magnet or a metal substance that can be attracted by magnets. The electromagnetic controller can move the sliding block towards the side wall of the vacuum impregnation tank by exerting electromagnetic force on the sliding block 7 directly.

Figure 3:
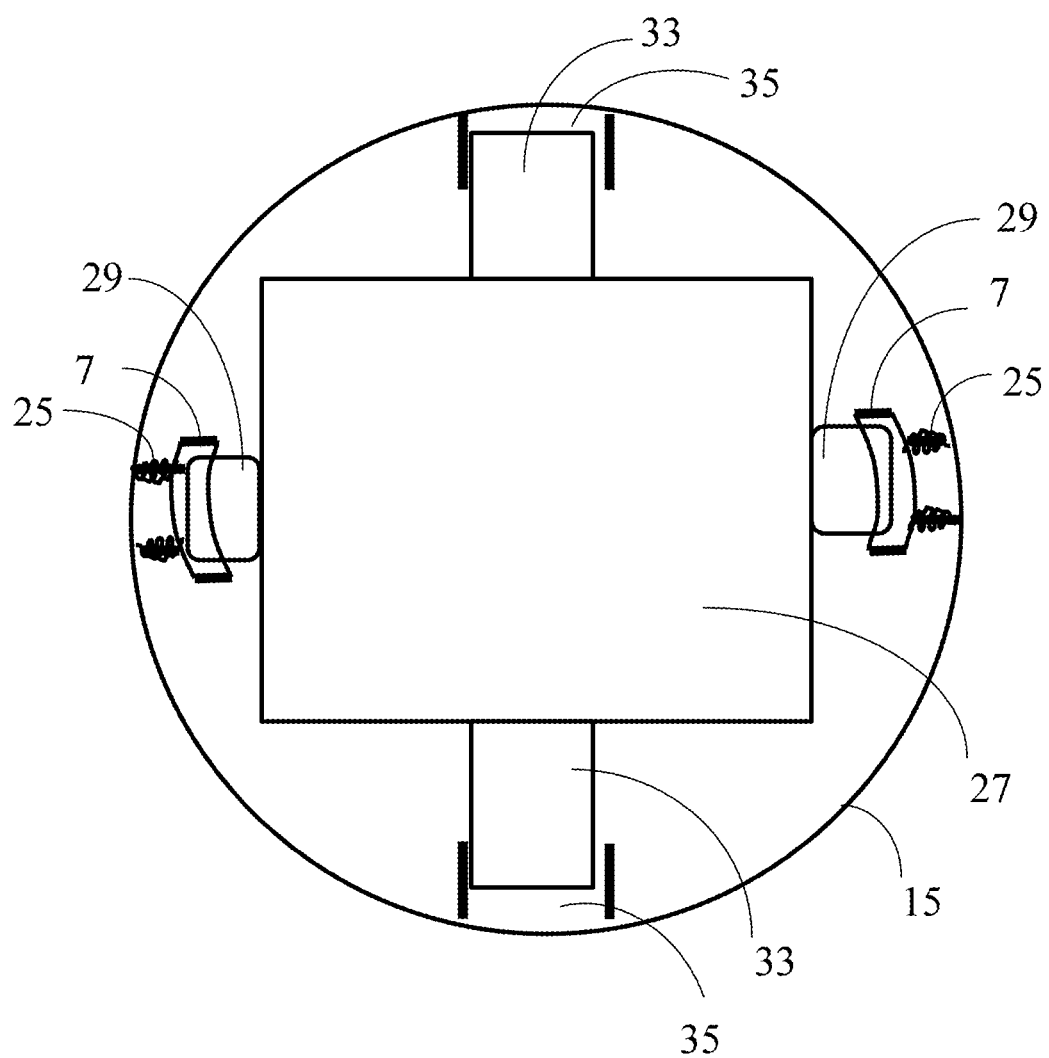
FIG. 3 is a top view of the vacuum impregnation device according to an exemplary embodiment of the present disclosure.

FIG. 3 is a top view of the vacuum impregnation device 1 according to an exemplary embodiment of the present disclosure. As shown in FIGS. 2 and 3, in the illustrated figures, the vacuum impregnation device 1 further includes two pair of springs 25. Each of the sliding blocks 7 is coupled to the side wall 15 of the vacuum impregnation tank 5 by the corresponding pair of springs 25. The sliding block 7 is moved towards the side wall 15 of the vacuum impregnation tank 5 when the electromagnetic controller 11 is turned on, and the sliding block 7 is restored by the corresponding pair of springs 25 when the electromagnetic controller 11 is turned off. It should be understood that, in some embodiments, the sliding block is moved towards the side wall of the vacuum impregnation tank when the electromagnetic controller is turned off, and the sliding block is restored by the springs when the electromagnetic controller is turned on. It should also be understood that one or more than two springs can be provided for each of the sliding block.

FIG. 4 shows another partial enlarged view of the vacuum impregnation device according to another exemplary embodiment of the present disclosure. As shown in FIG. 4, the transmission mechanism includes a linkage and a magnetic substance 19. The magnetic substance 19 herein includes magnets or metal substances that can be attracted by magnets. The linkage includes a first connecting rod 21 and a second connecting rod 23 which are connected to each other. The first connecting rod 21 is also connected to the sliding block 7 and the second connecting rod 23 is also connected to the magnetic substance 19. The magnetic substance 19 is pivotably connected to the side wall 15 of the vacuum impregnation tank 5. The magnetic substance 19 is disposed at a position corresponding to the electromagnetic controller 11. The sliding block 7 is coupled to the side wall 15 of the vacuum impregnation tank 5 by a pair of springs 25. The sliding block 7 is moved towards the side wall 15 of the vacuum impregnation tank 5 when the electromagnetic controller 11 is turned on, and the sliding block 7 is restored by the springs 25 when the electromagnetic controller 11 is turned off. The sliding block 7 is supported on a bracket 16. In this embodiment, the magnetic substance 19 is above the sliding block 7.

As shown in FIG. 1, in the illustrated figure, the vacuum impregnation device 1 further includes a net basket 27 for holding the workpiece 3. The net basket 27 has a rectangular shape and has an opening on the top. The workpiece 3 is held inside the net basket 27. With the net basket 27, it is easier to hold the workpiece 3, especially when it is necessary to vacuum impregnate several workpieces at a time or when the workpiece has an irregular shape. It should be understood that other types of components can be used to hold the workpiece.

As show in FIG. 1, in the illustrated figure, the net basket 27 includes two lifting lugs 29. Each of the lifting lugs 29 can be supported by the corresponding sliding block 7. With the lifting lugs 29 of the net basket 27, it is easier to support the workpiece 3 above the glue 13. In addition, when the impregnation process is finished, an operator or a robot can lift the net basket 27 to take the workpiece 3 out of the glue 13 by the lifting lugs 29. It should be understood that, in some embodiments where a net basket is not used, the workpiece may include a portion that can be supported by the sliding block directly, or the lifting lug is mounted onto the workpiece so that it can by supported by the sliding block.

As shown in FIG. 1, in the illustrated figure, the vacuum impregnation device further includes two catching components 31. The catching component 31 is coupled to the side wall 15 of the vacuum impregnation tank 5. Each of the catching components 31 is disposed below the corresponding sliding block 7. When the workpiece 3 is released and drops into the glue 13, the catching components 31 can catch the net basket 27 by catching the lifting lugs 29 of the net basket 27. Thus, the workpiece 3 in the net basket 27 can be held in the middle of the glue 13 so that all the surfaces of the workpiece 3 can be impregnated. It should be understood that, in some embodiments where the catching component is not provided, the net basket may drop to the bottom of the vacuum impregnation tank. The bottom of the vacuum impregnation tank may have a round shape so that the workpiece in the net basket may still be held in the middle of the glue which allows all the surfaces of the workpiece to be impregnated.

As shown in FIG. 3, in the illustrated figure, the net basket 27 further includes two projections 33 on two opposite sides of the net basket 27. The side wall 15 of the vacuum impregnation tank 5 is provided with two guiding grooves 35 extending vertically. Each of the projections 33 is guided in the corresponding guiding groove 35. As a result, the net basket 27 may drop vertically into the glue 13. Specifically, each of the guiding grooves 35 is formed by two parallel plates which are connected to the side wall 15 of the vacuum impregnation tank 5 and extend vertically in parallel. This configuration can help the net basket to drop vertically and make it easy for the catching components 31 to catch the net basket 27 by the lifting lugs 29. It should be understood that in some embodiments, the projections and the guiding grooves may not be provided. In some embodiments, four vertical edges of the net basket (when the net basket has a cubic shape) may be confined by the side wall of the vacuum impregnation tank such that the net basket can drop vertically.

As shown in FIG. 1, in the illustrated figure, the vacuum impregnation tank includes a tank cover 37 and a tank body 39. The tank cover 37 can open and close the tank body 39. The 39. The tank cover 37 and the tank body 39 are connected by screwing the flange of the tank cover 37 and the flange of the tank body 39. The glue 13 can be poured into the tank body 39 through the opening of the tank body 39. The net basket 27 with the workpiece 3 held inside can be placed inside the tank body 39 through the opening of the tank body 39.

As shown in FIG. 1, in the illustrated figure, the vacuum impregnation device further includes a vacuum pump 41. The vacuum pump 41 is coupled to the tank cover 37. The vacuum pump 41 can evacuate the air in the vacuum impregnation tank 5 during the vacuum stage.

As shown in FIG. 1, in the illustrated figure, compressed air 43 can flow into the vacuum impregnation tank 5 through the tank cover 37 such that the vacuum impregnation tank 5 is pressurized. The vacuum impregnation device further includes a piezometer 45. The piezometer 45 is coupled to the tank cover 37. It can help detect the air pressure inside the vacuum impregnation tank 5.

It should be understood that, in some embodiments, the vacuum pump and the piezometer are coupled to the tank body and the compressed air flows into the vacuum impregnation tank through the tank body.

Now the process of the vacuum impregnation in the vacuum impregnation device 1 according to the present disclosure will be described below. First, the net basket 27 and the workpiece 3 held inside are placed inside the tank body 39 and are supported on the sliding blocks 7 by the lifting lugs 29. Then the tank cover 37 closes the tank body 39. The vacuum pump 41 evacuates the air in the vacuum impregnation tank 5 during the vacuum stage. The workpiece 3 is maintained in the vacuum stage for some time. After that, the electromagnetic controller 11 is turned on, and it attracts the magnetic substance 19 towards the side wall 15 of the vacuum impregnation tank 5, which in turn draws the second connecting rod 23 and the first connecting rod 21 towards the side wall 15 of the vacuum impregnation tank 5. As a result, the sliding block 7 is moved towards the side wall 15 of the vacuum impregnation tank 5. The lifting lugs 29 of the net basket 27 then loses support from the sliding blocks 7 and the net basket 27 drops into the glue 13 under gravity. The net basket 27 drops with the projections 33 thereof guided in the guiding grooves 35 until the lifting lugs 29 of the net basket 27 are caught by the catching components 31. And the net basket 27 with the workpiece 3 inside is kept in the middle of the glue 13. The vacuum stage is kept for several minutes and then the vacuum is broken to enable the fine pores of the workpiece 3 to be impregnated by the glue 13. In the impregnation stage, it is optional but preferable to introduce compressed air 43 through the tank cover 37 to pressurize the vacuum impregnation tank 5. After the impregnation stage, the vacuum impregnation tank 5 is opened and the net basket 27 is taken out by lifting the lifting lugs 29. The process of the vacuum impregnation is finished and the workpiece is then transferred to next processes, usually the cleaning process and the curing process.

From the above description, those skilled in the art shall be aware of the solutions and advantages of the vacuum impregnation device according to the present disclosure. For instance, the vacuum impregnation device of the present disclosure has simple structure and low cost. And it is easier to handle the vacuum impregnation process by only turning on and off the electromagnetic controller than transferring the glue or lifting the inner cylinder. The vacuum impregnation device of the present disclosure improves the airtightness and the robustness of the vacuum impregnation tank because no parts pass through the side wall of the vacuum impregnation tank to handle the vacuum impregnation process.

A person skilled in the art will readily recognize that various changes and modifications can be made therein without departing from the true spirit and scope of the invention as defined by the following claims.

What is claimed is:

1. A vacuum impregnation device for vacuum impregnating a workpiece, the vacuum impregnation device comprising:
   a vacuum impregnation tank for storing glue, the vacuum impregnation tank comprising a side wall;
   a sliding block coupled to the side wall of the vacuum impregnation tank, the sliding block being adapted for supporting the workpiece above the glue;
   an electromagnetic controller, the electromagnetic controller being disposed outside the vacuum impregnation tank and being operative to move the sliding block towards the side wall of the vacuum impregnation tank such that the workpiece is released and drops into the glue,
   a net basket for holding the workpiece, the net basket comprising a lifting lug adapted to be supported by the sliding block; and
   a catch coupled to the side wall of the vacuum impregnation tank, the catch being adapted to catch the net basket by the lifting lug, wherein the sliding block does not pass through the side wall of the vacuum impregnation tank.

2. The vacuum impregnation device of claim 1, further comprising a transmission mechanism coupled to the sliding block, the transmission mechanism being disposed inside the vacuum impregnation tank, the electromagnetic controller being operative to move the sliding block towards the side wall of the vacuum impregnation tank by the transmission mechanism.

3. The vacuum impregnation device of claim 2, wherein the transmission mechanism comprises a linkage and a magnetic substance, the linkage being connected to the sliding block at one end and being connected to the magnetic substance at the other end, the magnetic substance being disposed at a position corresponding to the electromagnetic controller.

4. The vacuum impregnation device of claim 3, wherein the linkage comprises a first connecting rod and a second connecting rod which are connected to each other.

5. The vacuum impregnation device of claim 1, further comprising a spring, the sliding block being coupled to the side wall of the vacuum impregnation tank by the spring.

6. The vacuum impregnation device of claim 5, the sliding block is adapted to be moved towards the side wall of the vacuum impregnation tank when the electromagnetic controller is turned on, and the sliding block is adapted to be restored by the spring when the electromagnetic controller is turned off.

7. The vacuum impregnation device of claim 1, wherein the vacuum impregnation tank comprises a tank cover and a tank body, the tank cover being adapted to open and close the tank body.

8. The vacuum impregnation device of claim 7 further comprising a vacuum pump coupled to the tank cover or the tank body.

9. The vacuum impregnation device of claim 7, wherein compressed air flows into the vacuum impregnation tank through the tank cover or the tank body.

10. The vacuum impregnation device of claim 7 further comprising a piezometer coupled to the tank cover or the tank body.

11. A vacuum impregnation device for vacuum impregnating a workpiece, the vacuum impregnation device comprising:
    a vacuum impregnation tank for storing glue, the vacuum impregnation tank comprising a side wall;

a sliding block coupled to the side wall of the vacuum impregnation tank, the sliding block being adapted for supporting the workpiece above the glue;

an electromagnetic controller, the electromagnetic controller being disposed outside the vacuum impregnation tank and being operative to move the sliding block towards the side wall of the vacuum impregnation tank such that the workpiece is released and drops into the glue, a net basket for holding the workpiece, the net basket comprising a lifting lug adapted to be supported by the sliding block, wherein the net basket further comprises a projection on a side, the side wall of the vacuum impregnation tank being provided with a guiding groove extending vertically, the projection being adapted to be guided in the guiding groove.

12. The vacuum impregnation device of claim 11, further comprising a transmission mechanism coupled to the sliding block, the transmission mechanism being disposed inside the vacuum impregnation tank, the electromagnetic controller being operative to move the sliding block towards the side wall of the vacuum impregnation tank by the transmission mechanism.

13. The vacuum impregnation device of claim 12, wherein the transmission mechanism comprises a linkage and a magnetic substance, the linkage being connected to the sliding block at one end and being connected to the magnetic substance at the other end, the magnetic substance being disposed at a position corresponding to the electromagnetic controller.

14. The vacuum impregnation device of claim 13, wherein the linkage comprises a first connecting rod and a second connecting rod which are connected to each other.

15. The vacuum impregnation device of claim 11, further comprising a spring, the sliding block being coupled to the side wall of the vacuum impregnation tank by the spring.

16. The vacuum impregnation device of claim 15, the sliding block is adapted to be moved towards the side wall of the vacuum impregnation tank when the electromagnetic controller is turned on, and the sliding block is adapted to be restored by the spring when the electromagnetic controller is turned off.

17. The vacuum impregnation device of claim 11, wherein the vacuum impregnation tank comprises a tank cover and a tank body, the tank cover being adapted to open and close the tank body.

18. The vacuum impregnation device of claim 17, further comprising a vacuum pump coupled to the tank cover or the tank body.

19. The vacuum impregnation device of claim 17, wherein compressed air flows into the vacuum impregnation tank through the tank cover or the tank body.

20. The vacuum impregnation device of claim 17, further comprising a piezometer coupled to the tank cover or the tank body.

* * * * *